(12) United States Patent
Tiessen et al.

(10) Patent No.: US 11,512,842 B2
(45) Date of Patent: Nov. 29, 2022

(54) ASSEMBLIES, SYSTEMS AND METHODS FOR BALANCED SUSPENSION OF LUMINAIRES

(71) Applicant: LMPG Inc., Surrey (CA)

(72) Inventors: Dave Tiessen, Vancouver (CA); Brian Tuulos, Anmore (CA)

(73) Assignee: LMPG Inc.

( * ) Notice: Subject to any disclaimer, the term of this patent is extended or adjusted under 35 U.S.C. 154(b) by 226 days.

(21) Appl. No.: 17/046,280

(22) PCT Filed: Apr. 26, 2019

(86) PCT No.: PCT/CA2019/050546
§ 371 (c)(1),
(2) Date: Oct. 8, 2020

(87) PCT Pub. No.: WO2019/204944
PCT Pub. Date: Oct. 31, 2019

(65) Prior Publication Data
US 2021/0071853 A1    Mar. 11, 2021

Related U.S. Application Data

(60) Provisional application No. 62/663,588, filed on Apr. 27, 2018.

(51) Int. Cl.
*F21V 21/16* (2006.01)
*F16M 13/02* (2006.01)
(Continued)

(52) U.S. Cl.
CPC ........... *F21V 21/16* (2013.01); *F16M 13/022* (2013.01); *F21V 21/104* (2013.01); *F16G 11/12* (2013.01); *F16M 2200/04* (2013.01)

(58) Field of Classification Search
CPC .... F16M 13/02; F16M 13/022; F16M 13/027; F16M 11/06; F16M 11/10; F16M 11/123;
(Continued)

(56) References Cited

U.S. PATENT DOCUMENTS 6,471,374 B1    10/2002  Thomas
6,517,222 B1 *   2/2003  Orlov ........................ F21S 8/06
                                                    362/147
(Continued)

FOREIGN PATENT DOCUMENTS

DE           19845752 A1 *  4/2000  ............. F21S 8/061
DE       202007017625 U1 *  5/2009  ................ F21S 8/06
(Continued)

*Primary Examiner* — Mariceli Santiago
(74) *Attorney, Agent, or Firm* — Oyen Wiggs Green & Mutala LLP

(57) ABSTRACT

Assemblies, systems and methods for balanced suspension of luminaires are provided. In some embodiments a luminaire mounting and suspension assembly is provided comprising a mounting unit and a plurality of suspension units. Each suspension unit comprises a housing coupled to the mounting unit and a yoke pivotally coupled to the housing at a pivot point. The yoke comprises a pair of cable grippers, each cable gripper positioned on opposing sides of the pivot point and configured to grip a suspension cable for suspending a luminaire, wherein an axis of the pivot point is perpendicular to axes of the suspension cables and whereby free rotation of the yoke about the pivot point evenly balances tension between the suspension cables. In some embodiments a luminaire system is provided comprising a mounting and suspension assembly and a luminaire suspended by the assembly. In some embodiments a method of suspending a luminaire is provided comprising providing and suspending a luminaire system and employing the system to evenly balance tension between pairs of suspension cables.

16 Claims, 4 Drawing Sheets

(51) Int. Cl.
*F21V 21/104* (2006.01)
*F16G 11/12* (2006.01)

(58) Field of Classification Search
CPC ... F16M 2200/04; F21V 21/16; F21V 21/104;
F21S 8/06; F21S 8/061; F21S 8/068
See application file for complete search history.

(56) References Cited

U.S. PATENT DOCUMENTS

| | | | |
|---|---|---|---|
| 10,704,775 B2 * | 7/2020 | Vavruskova | F21S 8/061 |
| 2007/0147053 A1 * | 6/2007 | Gagne | F21V 21/02 |
| | | | 362/404 |
| 2009/0251905 A1 | 10/2009 | Melzner | |
| 2013/0248673 A1 | 9/2013 | Townsend | |
| 2017/0198872 A1 | 7/2017 | Sonneman | |
| 2019/0162369 A1 * | 5/2019 | Sonneman | F21K 9/237 |

FOREIGN PATENT DOCUMENTS

| | | | | |
|---|---|---|---|---|
| DE | 202011004963 U1 * | 9/2011 | | F21S 8/061 |
| DE | 102014101729 A1 * | 7/2015 | | F21V 21/38 |
| EP | 0303999 A2 | 2/1989 | | |
| EP | 2146140 A2 | 1/2010 | | |
| GB | 2468738 A * | 9/2010 | | B66D 3/08 |

\* cited by examiner

US 11,512,842 B2

ASSEMBLIES, SYSTEMS AND METHODS FOR BALANCED SUSPENSION OF LUMINAIRES

REFERENCE TO RELATED APPLICATIONS

This application is a national phase entry of Patent Cooperation Treaty Patent application No. PCT/CA2019/050546, which claims priority to and the benefit of U.S. Provisional Patent Application No. 62/663,588 filed 27 Apr. 2018. Both of the foregoing applications are hereby incorporated by reference herein in their entireties for all purposes.

TECHNICAL FIELD

This invention relates to assemblies, systems and methods for balanced suspension of luminaires.

BACKGROUND

When suspending luminaires, it is sometimes necessary to have suspension cables arranged in adjacent pairs. This may be for aesthetic reasons, or may be due to the necessity to achieve a certain number of conductors with powered suspension cables.

Ideally, tension in all of the suspension cables should be even. However, because of granularity in the cable length adjustment mechanisms typically used in suspended luminaires, it is nearly impossible to achieve balanced cable tension in adjacent pairs using these mechanisms alone.

As suspension cable diameter increases, the increment of length adjustment will also typically increase. For powered suspension cable applications, relatively thick cables are required to reduce electrical resistance. These thick cables lead to coarser increments of length adjustment.

The result of the inability to make fine adjustments to cable length is that only one cable of the pair will carry the load, while the other is inevitably slack. Slack cables are detrimental to the aesthetics of the luminaire. With coarser cable length adjustment increments, the degree of slackness can quickly become unacceptable.

Evenly balancing tension between luminaire suspension cables to remove slack is desirable.

SUMMARY

In one aspect of the invention a luminaire mounting and suspension assembly is provided. The assembly comprises a mounting unit and a plurality of suspension units. Each suspension unit comprises a housing coupled to the mounting unit and a yoke pivotally coupled to the housing at a pivot point. The yoke comprises a pair of cable grippers, each cable gripper positioned on opposing sides of the pivot point and configured to grip a suspension cable for suspending a luminaire, wherein an axis of the pivot point is perpendicular to axes of the suspension cables and whereby free rotation of the yoke about the pivot point evenly balances tension between the suspension cables.

In some embodiments the housing comprises a pair of stops for limiting the range of rotation of the yoke about the pivot point. In some embodiments the yoke comprises a yoke plate with opposing end portions, and each sidewall of the housing comprises a shoulder defining the stop, whereby engagement of one of the end portions with a corresponding one of the stops defines a limit of the range of rotation of the yoke. In some embodiments the range of rotation of the yoke is limited to no greater than approximately 20 degrees, or approximately 15 degrees, or approximately 10 degrees.

In some embodiments the cable grippers are fixedly coupled to the yoke plate. The cable grippers may be aligned along a plane perpendicular to the axis of the pivot point. In some embodiments the yoke plate comprises a pair of opposing flanged yoke portions extending perpendicularly from the yoke plate, wherein the housing comprises a housing plate and a pair of opposing flanged housing portions extending perpendicularly from the housing plate, and wherein the pivot point is defined by a pivot pin rotatably coupling the flanged yoke portions and flanged housing portions. In some embodiments the yoke is positioned on top of the housing, whereby the yoke is acted on by compression forces due to the load of the luminaire. In other embodiments the yoke is positioned below the housing, whereby the yoke is acted on by tension forces due to the load of the luminaire. The housing plate may comprise a pair of apertures through which the cable grippers and/or suspension cables extend, the apertures dimensioned to accommodate lateral movement of the cable grippers and/or suspension cables due to the free rotation of the yoke.

In some embodiments the housing is pivotally coupled to the mounting unit. In other embodiments, the housing is fixedly coupled to the mounting unit. In some embodiments the suspension units are evenly arranged about the mounting unit. In some embodiments the assembly comprises a pair of power wires, each power wire extending from the mounting unit to a respective one of the cable grippers and connecting to a respective one of the suspension cables.

In one aspect of the invention a luminaire system is provided comprising a mounting and suspension assembly as described herein and a luminaire suspended by the assembly.

In one aspect of the invention a method of suspending a luminaire is provided. The method comprises providing and suspending a luminaire system as described herein; allowing the limitation of the range of motion of the yoke of each of the suspension units to support the luminaire by one of the suspension cables of each of the suspension units; adjusting length of the suspension cables with the cable grippers until any remaining length discrepancy between each pair of the suspension cables can be overcome with the range of motion of the yoke of each suspension unit; and allowing free rotation of the yoke of each suspension unit about the pivot point to evenly balance tension between the pairs of suspension cables in each of the yokes.

Further aspects and example embodiments are illustrated in the accompanying drawings and/or described in the following description.

BRIEF DESCRIPTION OF DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention relates to luminaires, and in particular to assemblies, systems and methods for balanced suspension of luminaires where suspension cables are arranged in pairs. Aspects of the invention relate to providing a plurality of suspension units evenly arranged about a mounting unit. Each suspension unit includes a pair of suspension cables from which a luminaire is suspended. Tensioning between each pair of suspension cables is balanced by a yoke mechanism to remove any slack in the suspension cables.

Figure 1:
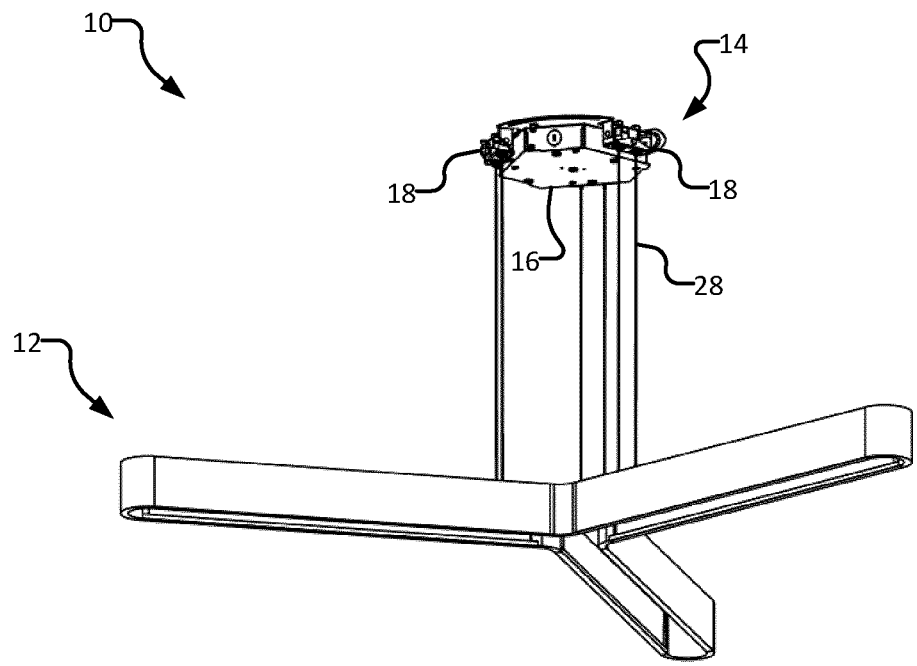
FIG. 1 is an isometric view of a luminaire system according to an embodiment of the invention showing the suspension cables in balanced tension.
Figure 2:
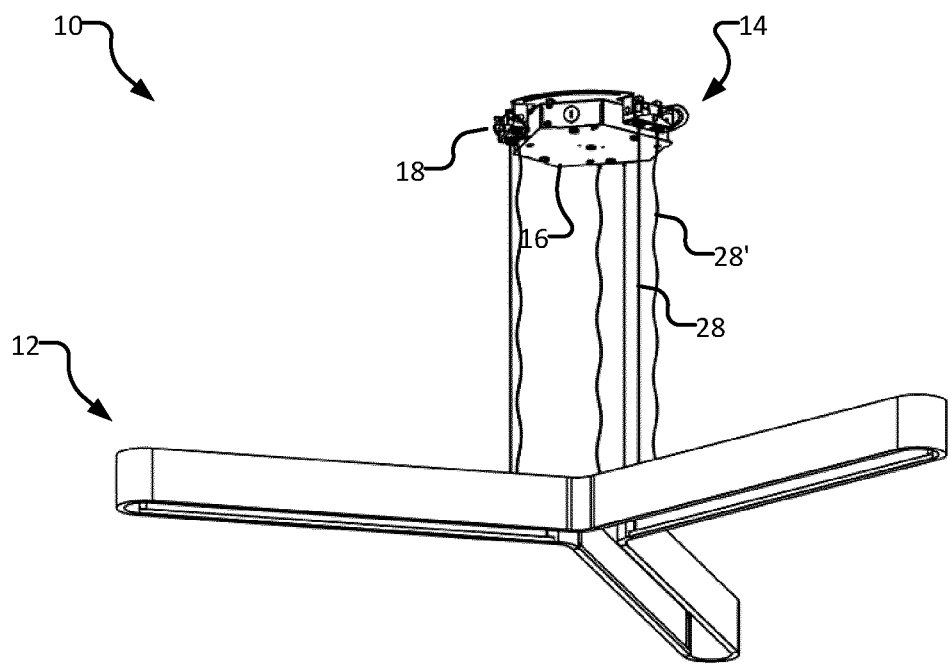
FIG. 2 is an isometric view of a luminaire system according to the embodiment shown in FIG. 1 showing the suspension cables in unbalanced tension.
Figure 3:
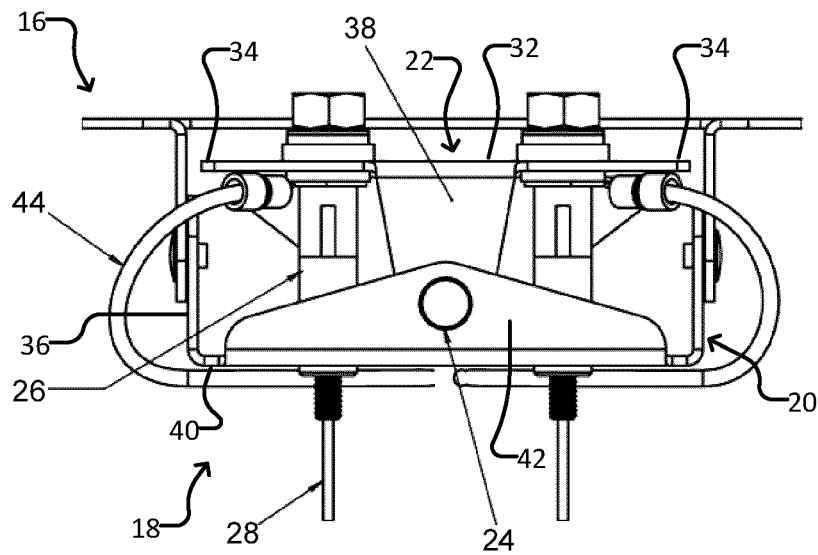
FIG. 3 is a partial side view of a luminaire mounting and suspension assembly according to an embodiment of the invention.

FIGS. 1 and 2 show a luminaire system 10 according to an embodiment of the invention. Luminaire system 10 includes a luminaire 12 suspended by a luminaire mounting and suspension assembly 14. Assembly 14 includes a mounting unit 16 and a plurality of suspension units 18. Suspension units 18 are evenly arranged about mounting unit 16. In the illustrated embodiments three suspension units 18 are provided. In other embodiments, less or more suspension units 18 may be provided. Each suspension unit 18 includes a pair of suspension cables 28.

In FIG. 1 suspension cables 28 are equally tensioned and taut whereas in FIG. 2 suspension cables 28 are taut while suspension cables 28' are slack. That is, FIG. 2 shows system 10 before the suspension cables are automatically balanced by the invention as described herein.

FIGS. 2, 3, 5, 6, 8 and 9 show assembly 14, and in particular suspension unit 18, in greater detail. Suspension unit 18 includes a housing 20 and a yoke 22. Housing 20 is coupled to mounting unit 16. In some embodiments, housing 20 may be pivotally coupled to mounting unit 16 at pivot points 48. In other embodiments, housing 20 may be fixedly coupled, or integrally formed with, mounting unit 16.

Housing 20 is pivotally coupled to yoke 22 at pivot point 24. In some embodiments, a pair of cables grippers 26 is mounted on yoke 22. In other embodiments, cable grippers 26 may be integrally formed with yoke 22. Cable grippers 26 are configured, as known in the art, to grippingly engage and disengage a suspension cable extending therethrough to adjust the length of suspension cable 28 for suspending luminaire 12. Power wires 46 extend from mounting unit 16 to a respective one of cable grippers 26 and connect to a respective one of suspension cables 28 to deliver power to luminaire 12.

Cable grippers 26 are positioned on yoke 22 equidistantally on either side of pivot point 24. The axes of suspension cables 28 are perpendicular to the axis of pivot point 24. Accordingly, once the lengths of suspension cables 28 are set by cable grippers 26, free rotation of yoke 22 about pivot point 24 evenly balances tension between the pair of suspension cables 28.

Rotation of yoke 22 is limited to a range of rotation 50 as described herein. Housing 20 includes a pair of stops 30. In some embodiments, stops 30 are shoulders of sidewalls 36 of housing 20. Yoke 22 includes a yoke plate 32 to which cable grippers 26 are fixed. Cable grippers 26 may be aligned along a plane perpendicular to the axis of pivot point 24.

Figure 4:
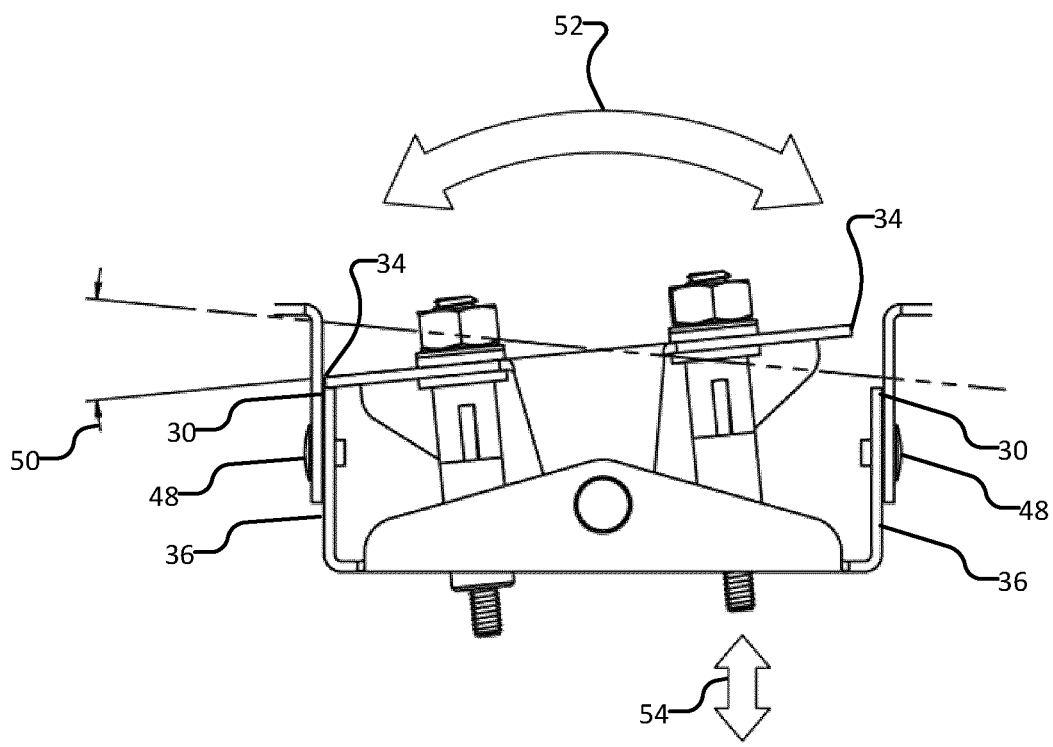
FIG. 4 is a side view of a suspension unit of the luminaire mounting and suspension assembly according to the embodiment shown in FIG. 3, shown the range of motion of the yoke.

Yoke plate also has opposing end portions 34. As shown best in FIG. 4, yoke plate 32 spans housing 22 such that an end portion 34 will engage a shoulder 30 at one extreme of range of rotation 50 of yoke 22, and the other end portion 34 will engage the other shoulder 30 at the other extreme of range of rotation 50 of yoke 22. FIG. 4 shows rotational movement of yoke 22, indicated by arrow 52, and the resulting vertical displacement of cable grippers 26 (and therefore suspension cables 28), indicated by arrow 54. This vertical displacement defines the fine adjustment that evenly balances the tensioning between the pairs of suspension cables 28.

In some embodiments, range of rotation 50 of yoke 22 is limited to no greater than approximately 20 degrees, or approximately 15 degrees, or approximately 10 degrees.

Figure 9:
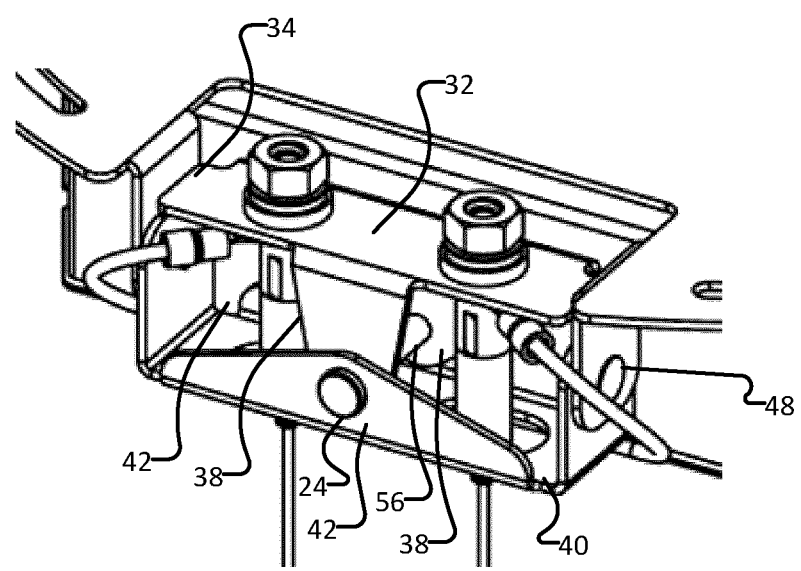
FIG. 9 is a partial top isometric view of the luminaire mounting and suspension assembly according to the embodiment shown in FIG. 3.

Yoke plate 32 includes a pair of opposing flanged yoke portions 38 extending perpendicularly from the front and back of yoke plate 32. Housing 20 includes a housing plate 40 and a pair of opposing flanged housing portions 42 extending perpendicularly from the front and back of housing plate 40. Pivot point 24 includes a pin 56 rotatably coupling the flanged yoke portions 38 and flanged housing portions 42, as best shown in FIG. 9.

Figure 5:
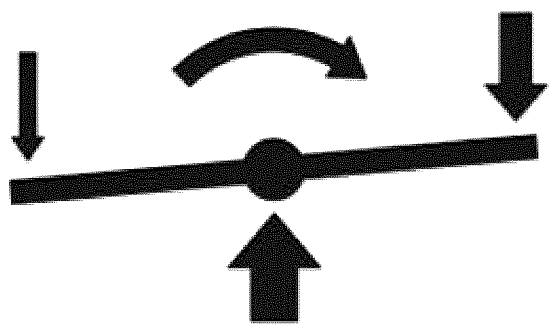
FIG. 5 is a diagram depicting unbalanced forces on the yoke of a suspension unit of the luminaire mounting and suspension assembly according to the embodiment shown in FIG. 3.
Figure 6:
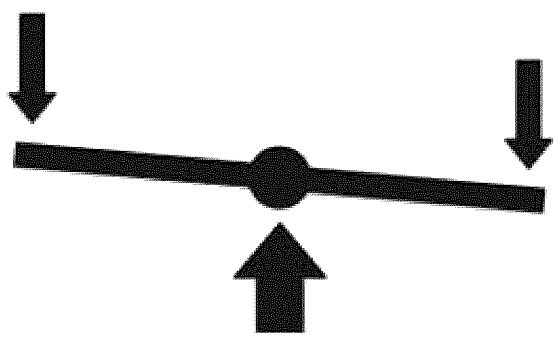
FIG. 6 is a diagram depicting balanced forces on the yoke of a suspension unit of the luminaire mounting and suspension assembly according to the embodiment shown in FIG. 3.

In the illustrated embodiment, yoke 22 is positioned on top of housing 20, and the load of luminaire 12 results in compression forces acting on yoke 22 as shown in FIGS. 5 and 6. As shown in FIG. 5, if the load is uneven (i.e., one cable 28 is taut and the other cable 28' is slack as shown in FIG. 2), then yoke 22 will pivot until it reaches equilibrium with balanced loads as shown in FIG. 6 (i.e., both cables 28 are taut, as shown in FIG. 1).

Figure 7:
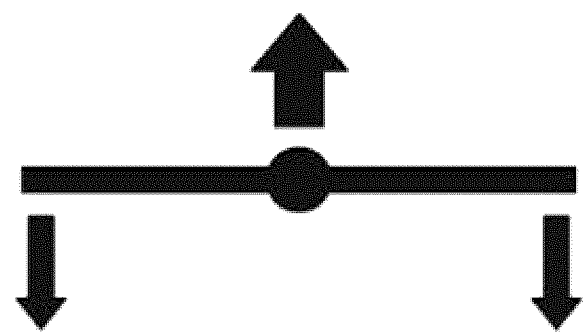
FIG. 7 is a diagram depicting balanced forces on the yoke of a suspension unit of a luminaire mounting and suspension assembly according to an embodiment of the invention.

In other embodiments, yoke 22 may be positioned below housing 20, and the load of luminaire 12 results in tension forces acting on yoke 22. If the load is uneven, yoke 22 will pivot until it reaches equilibrium as shown in FIG. 7.

Regardless of whether yoke 22 is positioned above or below housing 20, the geometry of luminaire 12 and the additional suspension units 18 (and their respective suspension cables 28) ensure luminaire 12 is restricted from rotating around an axis parallel to the axis of pivot point 24. In other words, once equilibrium is achieved in each yoke 22 of assembly 14, luminaire system 10 is stable and not susceptible to oscillation.

Figure 8:
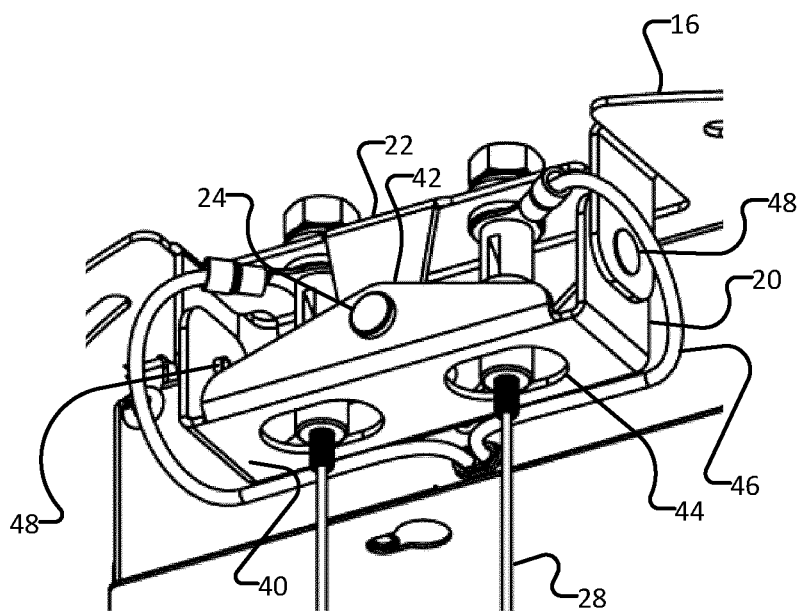
FIG. 8 is a partial bottom isometric view of the luminaire mounting and suspension assembly according to the embodiment shown in FIG. 3.

As shown best in FIGS. 8 and 9, housing 20 may be pivotally coupled to mounting unit 16. In other embodiments, housing 20 may be fixedly coupled, or integrally formed with, mounting unit 16.

As shown best in FIG. 8, housing plate 40 may include a pair of apertures 44 through which cable grippers 26 and/or suspension cables 28 extend. Apertures 44 are dimensioned to accommodate lateral movement of cable grippers 26 and/or suspension cables 28 as yoke 22 rotates to achieve equilibrium.

In operation, a luminaire system 10 is provided and suspended. The limitation of range of motion 50 of yokes 22 allows one of each of the pairs of the suspension cables 28 of each of the suspension units 18 to stably support luminaire 12. The length of suspension cables 28 is adjusted using the mechanism of cable grippers 26 until any remaining length discrepancy between each pair of suspension cables 28 can be overcome with the range of motion of yoke 22 of each suspension unit 18 (i.e., vertical displacement 54 shown in FIG. 4). Then, free rotation of yoke 22 of each suspension unit 18 about its pivot point 22 will evenly balance tension between the pairs of suspension cables 28 in each of yokes 22 to remove any slack and provide tautness for each suspension cable 28 of luminaire system 10.

Where a component (e.g. cable wire, projection, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions, omissions and sub-combinations thereof. It is therefore intended that the following appended claims and claims hereafter introduced are interpreted to include all such modifications, permutations, additions, omissions and sub-combinations as are consistent with the broadest interpretation of the specification as a whole.

The invention claimed is:

1. A luminaire mounting and suspension assembly comprising:
    a mounting unit;
    a plurality of suspension units, each comprising:
        a housing coupled to the mounting unit; and
        a yoke pivotally coupled to the housing at a pivot point, the yoke comprising a pair of cable grippers, each cable gripper positioned on opposing sides of the pivot point and configured to grip a suspension cable for suspending a luminaire;
    wherein an axis of the pivot point is perpendicular to axes of the suspension cables; and
    whereby free rotation of the yoke about the pivot point evenly balances tension between the suspension cables.

2. An assembly according to claim 1 wherein the housing comprises a pair of stops for limiting the range of rotation of the yoke about the pivot point.

3. An assembly according to claim 2 wherein the yoke comprises a yoke plate with opposing end portions, and each sidewall of the housing comprises a shoulder defining the stop, whereby engagement of one of the end portions with a corresponding one of the stops defines a limit of the range of rotation of the yoke.

4. An assembly according to claim 3 wherein the range of rotation of the yoke is limited to no greater than approximately 20 degrees.

5. An assembly according to claim 4 wherein cable grippers are fixedly coupled to the yoke plate.

6. An assembly according to claim 5 wherein the cable grippers are aligned along a plane perpendicular to the axis of the pivot point.

7. An assembly according to claim 6 wherein the yoke plate comprises a pair of opposing flanged yoke portions extending perpendicularly from the yoke plate, wherein the housing comprises a housing plate and a pair of opposing flanged housing portions extending perpendicularly from the housing plate, and wherein the pivot point is defined by a pivot pin rotatably coupling the flanged yoke portions and flanged housing portions.

8. An assembly according to claim 7 wherein the yoke is positioned on top of the housing, whereby the yoke is acted on by compression forces due to the load of the luminaire.

9. An assembly according to claim 8 wherein the housing plate comprises a pair of apertures through which the cable grippers and/or suspension cables extend, the apertures dimensioned to accommodate lateral movement of the cable grippers and/or suspension cables due to the free rotation of the yoke.

10. An assembly according to claim 7 wherein the yoke is positioned below the housing, whereby the yoke is acted on by tension forces due to the load of the luminaire.

11. An assembly according to claim 1 wherein housing is pivotally coupled to the mounting unit.

12. An assembly according to claim 1 wherein housing is fixedly coupled to the mounting unit.

13. An assembly according to claim 1 wherein the suspension units are evenly arranged about the mounting unit.

14. An assembly according to claim 1 further comprising a pair of power wires, each power wire extending from the mounting unit to a respective one of the cable grippers and connecting to a respective one of the suspension cables.

15. A luminaire system comprising:
    a mounting and suspension assembly according to claim 1; and
    a luminaire suspended by the assembly.

16. A method of suspending a luminaire comprising:
    (a) providing and suspending a luminaire system according to claim 15;
    (b) allowing the limitation of the range of motion of the yoke of each of the suspension units to support the luminaire by one of the suspension cables of each of the suspension units;
    (c) adjusting length of the suspension cables with the cable grippers until any remaining length discrepancy between each pair of the suspension cables can be overcome with the range of motion of the yoke of each suspension unit; and
    (d) allowing free rotation of the yoke of each suspension unit about the pivot point to evenly balance tension between the pairs of suspension cables in each of the yokes.

* * * * *